(12) United States Patent
Kang et al.

(10) Patent No.: US 9,335,585 B2
(45) Date of Patent: May 10, 2016

(54) LIQUID CRYSTAL DISPLAY AND OPTICAL COMPENSATION METHOD THEREFOR

(71) Applicant: Shenzhen China Star Optoelectronics Technology Co., Ltd., Shenzhen (CN)

(72) Inventors: Chihtsung Kang, Shenzhen (CN); Bo Hai, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 14/115,576

(22) PCT Filed: Jun. 27, 2013

(86) PCT No.: PCT/CN2013/078236
§ 371 (c)(1),
(2) Date: Nov. 4, 2013

(87) PCT Pub. No.: WO2014/180048
PCT Pub. Date: Nov. 13, 2014

(65) Prior Publication Data
US 2016/0070129 A1 Mar. 10, 2016

(30) Foreign Application Priority Data
May 9, 2013 (CN) .......................... 2013 1 0167900

(51) Int. Cl.
*G02F 1/1335* (2006.01)
*G02F 1/13363* (2006.01)

(52) U.S. Cl.
CPC ...... *G02F 1/13363* (2013.01); *G02F 1/133528* (2013.01); *G02F 1/133634* (2013.01)

(58) Field of Classification Search
CPC ................... G02F 1/133634; G02F 1/133528; G02F 1/13363
USPC ......................................................... 349/117
See application file for complete search history.

(56) References Cited

U.S. PATENT DOCUMENTS

| | | |
|---|---|---|
| 2002/0149733 A1 | 10/2002 | Lyu et al. |
| 2006/0103798 A1 | 5/2006 | Jang et al. |
| 2007/0188686 A1 | 8/2007 | Yano et al. |
| 2007/0211199 A1* | 9/2007 | Kobayashi ........ G02F 1/133528 349/117 |
| 2007/0279553 A1 | 12/2007 | Yoda et al. |
| 2008/0291372 A1* | 11/2008 | Higano ............... G02F 1/13363 349/98 |
| 2009/0174844 A1* | 7/2009 | Li ....................... C08K 5/34926 349/75 |

FOREIGN PATENT DOCUMENTS

| | | |
|---|---|---|
| CN | 1860404 | 11/2006 |
| CN | 1954252 | 4/2007 |
| CN | 1969226 | 5/2007 |

* cited by examiner

*Primary Examiner* — Hoan C Nguyen
(74) *Attorney, Agent, or Firm* — Ladas & Parry LLP (57) ABSTRACT

A liquid crystal display and an optical compensation method therefor are provided specifically for adjusting compensation values of an uniaxial positive birefringence A-compensation film (A-Plate) and an uniaxial negative birefringence C-compensation film (C-Plate) and particularly for controlling a valuing range of a compensation value ($R_{th}$) of the C-Plate, so as to reduce the dark-state light leakage by adjusting the compensation values of two types of the compensation film. Thus, the present invention can reduce the dark-state light leakage of a large viewing angle and increase the contrast and definition of the large viewing angle.

15 Claims, 6 Drawing Sheets isoluminance contour

Fig.1
PRIOR ART equal contrast ratio contour

Fig.6 isoluminance contour

Fig.7 equal contrast ratio contour

Fig.8 isoluminance contour

Fig.9 equal contrast ratio contour

Fig.10 isoluminance contour

Fig.11 equal contrast ratio contour

Fig.12

LIQUID CRYSTAL DISPLAY AND OPTICAL COMPENSATION METHOD THEREFOR

CROSS-REFERENCE TO RELATED APPLICATIONS

This application represents a National Stage application of PCT/CN2013/078236 entitled "Liquid Crystal Display and Compensation Method Therefor" filed Jun. 27, 2013, pending.

FIELD OF THE INVENTION

The present invention relates to a field of technology of liquid crystal display and more particularly to a liquid crystal display and an optical compensation method therefor.

BACKGROUND OF THE INVENTION

The quality requirement of the liquid crystal display (LCD) panel is higher and higher with the growing popularity of the liquid crystal display panel. For example, with the increasing of the viewing angle of a thin film transistor LCD (TFT-LCD), the contrast and resolution of the screen thereof are gradually decreased. It is due to a result that a birefringence of the liquid crystal molecule in the liquid crystal layer is changed with the variation of the viewing angle. The dark-state light leakage can be effectively reduced by a wide viewing angle compensation film. A contrast of the screen can be considerably increased within a specific viewing angle.

The compensation principle of the compensation film is generally to correct the phase difference due to different viewing angles of the liquid crystal, so that the birefringence property of the liquid crystal molecule can be symmetrically compensated.

Different compensation films are used for different liquid crystal display modes, wherein the compensation film of a large-size LCD TV is used for a vertical alignment (VA) display mode, such as the N-TAC of Konica company used in early stage, the improved Zeonor of OPOTES company, the F-TAC of Fujitsu company, and the X-Plate of Nitto Denko company.

Figure 1:
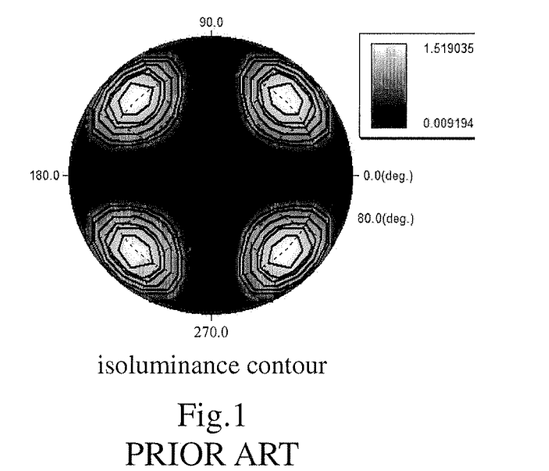
FIG. 1 is an isoluminance contour diagram of a traditional technology by using compensate values of an A-Plate and a C-Plate to compensate the dark-state light leakage.
Figure 2:
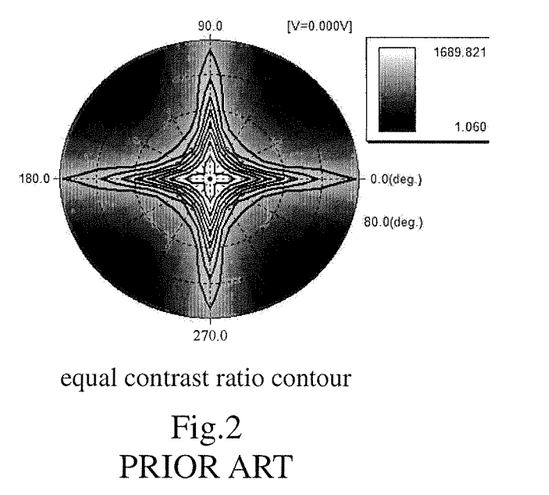
FIG. 2 is an equal contrast ratio contour diagram in full viewing angle of the traditional technology after being compensated by using compensate values of the A-Plate and the C-Plate.

If the compensation values of the compensation films are different for the same optical path difference of the liquid crystal, the dark-state light leakage and the contrast of the large viewing angle are different. Referring to FIG. 1 and FIG. 2, FIG. 1 is an isoluminance contour diagram of a traditional technology by using an uniaxial positive birefringence A-compensation film (A-Plate) and an uniaxial negative birefringence C-compensation film (C-Plate) to compensate the dark-state light leakage, and FIG. 2 is an equal contrast ratio contour diagram in full viewing angle of the traditional technology after being compensated by using the A-Plate and the C-Plate, wherein the compensation values of A-Plate and C-Plate are listed as follows:

| optical path difference of liquid crystal | pre-tilt angle of liquid crystal | A-Plate $R_o$ | A-Plate $R_{th}$ | C-Plate $R_{th}$ |
|---|---|---|---|---|
| 352.1 nm | 89° | 109 nm | 55 nm | 403 nm |

As shown in FIG. 1 and FIG. 2, when the compensation values of A-Plate and C-Plate are used, a serious light leakage may be generated if watching at a large viewing angle in a dark state, wherein the contrast of the large viewing angle becomes poor and the range of the viewing angle is actually small.

It is therefore tried to solve the problem, as described above.

SUMMARY OF THE INVENTION

A primary object of the present invention is to provide a liquid crystal display and an optical compensation method therefor, which are used to solve the problem of using the compensation value of the traditional A-Plate and C-Plate to cause the serious light leakage when watching at a large viewing angle in a dark state, the contrast of the large viewing angle becomes poor and the range of the viewing angle is actual small.

To achieve the above object, the present invention provides a liquid crystal display, wherein the liquid crystal display has a wavelength at 550 nm and a range of an optical path difference (LC$_A$ND) of the liquid crystal is 342.8 nm≤LC$_A$ND≤361.4 nm, the liquid crystal display comprising:
  a first substrate;
  a second substrate;
  a liquid crystal layer disposed between the first substrate and the second substrate;
  a first polarizing film disposed on an outer side of the first substrate;
  a second polarizing film disposed on an outer side of the second substrate;
  an uniaxial positive birefringence A-compensation film (A-Plate); and
  two layers of uniaxial negative birefringence C-compensation film (C-Plate), wherein the A-Plate and two layers of the C-Plate are disposed between the first substrate and the first polarizing film or disposed between the second substrate and the second polarizing film;
  wherein a valuing range of an in-plane optical path difference compensation value ($R_0$) of the A-Plate is 98 nm≤$R_0$≤172 nm, a valuing range of an out-of-plane optical path difference compensation value ($R_{th}$) of the A-Plate is 49 nm≤$R_{th}$≤86 nm; a valuing range of a compensation value ($R_{th}$) of two layers of the C-Plate is $Y_1$≤$R_{th}$≤$Y_2$, and $Y_1$ and $Y_2$ satisfies the following functions:

$$Y_1 = -0.000415X^3 + 0.11423X^2 - 9.845X + 373.67;$$

$$Y_2 = 0.000105X^3 - 0.038075X^2 + 3.7X + 46.15;$$

wherein X is the out-of-plane optical path difference compensation value ($R_{th}$) of the A-Plate.

To achieve the above object, the present invention provides a liquid crystal display, comprising:
  a first substrate;
  a second substrate;
  a liquid crystal layer disposed between the first substrate and the second substrate;
  a first polarizing film disposed on an outer side of the first substrate;
  a second polarizing film disposed on an outer side of the second substrate;
  an uniaxial positive birefringence A-compensation film (A-Plate); and two layers of uniaxial negative birefringence C-compensation film (C-Plate), wherein the A-Plate and the two layers of the C-Plate are disposed between the first substrate and the first polarizing film or disposed between the second substrate and the second polarizing film;

wherein a valuing range of an in-plane optical path difference compensation value ($R_O$) of the A-Plate is 98 nm≤$R_O$≤172 nm, a valuing range of an out-of-plane optical path difference compensation value ($R_{th}$) of the A-Plate is 49 nm≤$R_{th}$≤86 nm, a valuing range of a compensation value ($R_{th}$) of the C-Plate is $Y_1$≤$R_{th}$≤$Y_2$, and $Y_1$ and $Y_2$ satisfies the following functions:

$$Y_1=-0.000415X^3+0.11423X^2-9.845X+373.67;$$

$$Y_2=0.000105X^3-0.038075X^2+3.7X+46.15;$$

wherein X is the out-of-plane optical path difference compensation value ($R_{th}$) of the A-Plate.

To achieve the above object, the present invention provides an optical compensation method for a liquid crystal display, comprising steps of:

adjusting a valuing range of an in-plane optical path difference compensation value ($R_O$) of an uniaxial positive birefringence A-compensation film (A-Plate) to 98 nm≤$R_O$≤172 nm;

adjusting a valuing range of an out-of-plane optical path difference compensation value ($R_{th}$) of the A-Plate to 49 nm≤$R_{th}$≤86 nm; and adjusting a valuing range of a compensation value $R_{th}$ of uniaxial negative birefringence C-compensation films (C-Plates) to $Y_1$≤$R_{th}$≤$Y_2$, wherein $Y_1$ and $Y_2$ satisfies the following functions:

$$Y_1=--0.000415X^3+0.11423X^2-9.845X+373.67;$$

$$Y_2=0.000105X^3-0.038075X^2+3.7X+46.15;$$

wherein X is the out-of-plane optical path difference compensation value ($R_{th}$) of the A-Plate; and the A-Plate and the C-Plates are disposed between a first substrate and a first polarizing film of the liquid crystal display or disposed between a second substrate and a second polarizing film of the liquid crystal display.

The present invention reduces the dark-state light leakage of a large viewing angle by adjusting the compensation values of the A-Plate and the C-Plate in the liquid crystal display. The implementation of the present invention can effectively increase the contract and resolution of the viewing angle.

To allow the contents of the present invention will become apparent, the preferred embodiments and the drawings are described, as follows:

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal and etc., are only directions by referring to the accompanying drawings and thus the used directional terms are used to describe and understand the present invention, but the present invention is not limited thereto.

Figure 3:
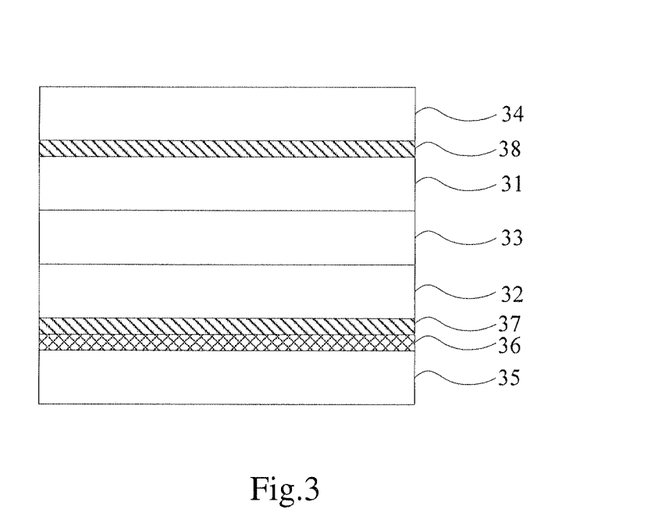
FIG. 3 is a structural schematic view of a liquid crystal display of a first preferred embodiment of the present invention.

Referring now to FIG. 3, FIG. 3 is a structural schematic view of a liquid crystal display of a first preferred embodiment of the present invention.

The liquid crystal display of the embodiment of the present invention is preferably a vertical alignment liquid crystal display (VA-LCD), the wavelength range of the liquid crystal display is a visible light range (308 nm to 760 nm), preferably is 550 nm; and a range of an optical path difference ($LC_A ND$) of the liquid crystal at 550 nm of the liquid crystal display is 342.8 nm≤$LC_A ND$≤361.4 nm, i.e. [342.8 nm,361.4 nm]; a range of a pre-tilt angle of the liquid crystal is 85°≤Pre-tilt angle<90°, i.e. [85°,90°].

Referring to FIG. 3, in the first embodiment, the liquid crystal display comprises a first substrate 31, a second substrate 32, a liquid crystal layer 33, a first polarizing film 34, and a second polarizing film 35. The liquid crystal layer 33 is disposed between the first substrate 31 and the second substrate 32, the first polarizing film 34 is disposed on an outer side of the first substrate 31, and the second polarizing film 35 is disposed on an outer side of the second substrate 32.

The liquid crystal display more comprises an uniaxial positive birefringence A-compensation film (A-Plate) 36, a first uniaxial negative birefringence C-compensation film (C-Plate) 37 and a second C-Plate 38. Referring to FIG. 3, in a specific implementation, the A-Plate 36 and the first C-Plate 37 are disposed between the second substrate 32 and the second polarizing film 35, the A-Plate 36 and the first C-Plate 37 comprise the same slow axis (0°), and the slow axis is perpendicular to an absorption axis (90°) of the second polarizing film; The second C-Plate 38 is disposed between the first substrate 31 and the first polarizing film 34, and the second C-Plate 38 comprises a slow axis (90°), and the slow axis is perpendicular to an absorption axis (0°) of the first polarizing film 34.

Figure 4:
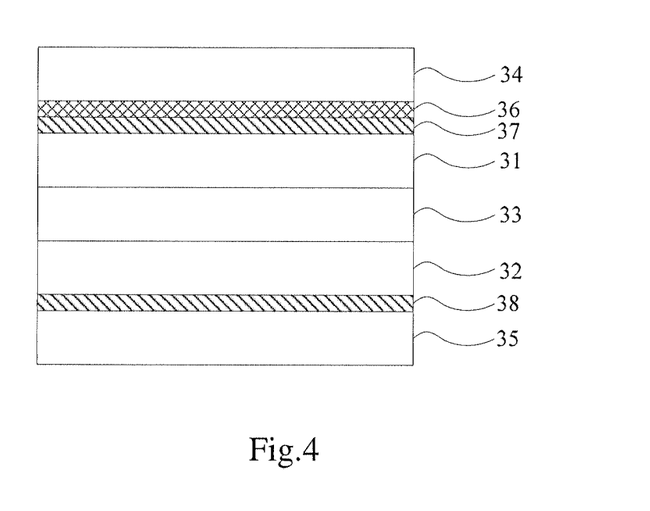
FIG. 4 is a structural schematic view of a liquid crystal display of a second preferred embodiment of the present invention.

Referring to FIG. 4, in a second embodiment, the A-Plate 36 and the first C-Plate 37 are disposed between the first substrate 31 and the first polarizing film 34, the A-Plate 36 and the first C-Plate 37 comprise the same slow axis (90°), and the slow axis is perpendicular to an absorption axis (0°) of the second polarizing film; The second C-Plate 38 is disposed between the second substrate 32 and the second polarizing film 35, and the second C-Plate 38 comprises a slow axis (0°), and the slow axis is perpendicular to an absorption axis (90°) of the second polarizing film 35.

In the preferred embodiments of the liquid crystal display as above, an absorption axis of the first polarizing film 34 is 0°, and an absorption axis of the second polarizing film 35 is 90°; in other embodiments, when the absorption axis of the first polarizing film 34 is 90° and the absorption axis of the second polarizing film 35 is 0°, it also can be applied to the present invention only if a slow axis of the A-Plate 36 or a slow axis of the C-Plates 37, 38 are perpendicular to an absorption axis of the polarizing film (first polarizing film 34 or second polarizing film 35) on the same side of the liquid crystal layer 33.

In the present invention, the dark-state light leakage is simulated by disposing different compensation values of the A-Plate and the C-Plates 37, 38, and the range of the compensation value corresponding to the dark-state light leakage is obtained according to the simulation result.

During the simulation, an included angle of 90° is set between the slow axes of the A-Plate 36 and the C-Plate 37 and the absorption axis of the first polarizing film for obtaining the best compensation effect; and the range of a pre-tilt angle of the liquid crystal is set in [85°, 90°]; A pretwist angle of the liquid crystal in the four quadrants is set to 45°; an optical path difference ($LC_AND$) of the liquid crystal is set in [342.8 nm, 361.4 nm]; the light of the simulation is a spectrum of Blu-ray YAG (Yttrium Aluminum Garnet) LED, wherein the central luminance is defined as 100 nit, the light distribution is Lambert distribution.

Figure 5:
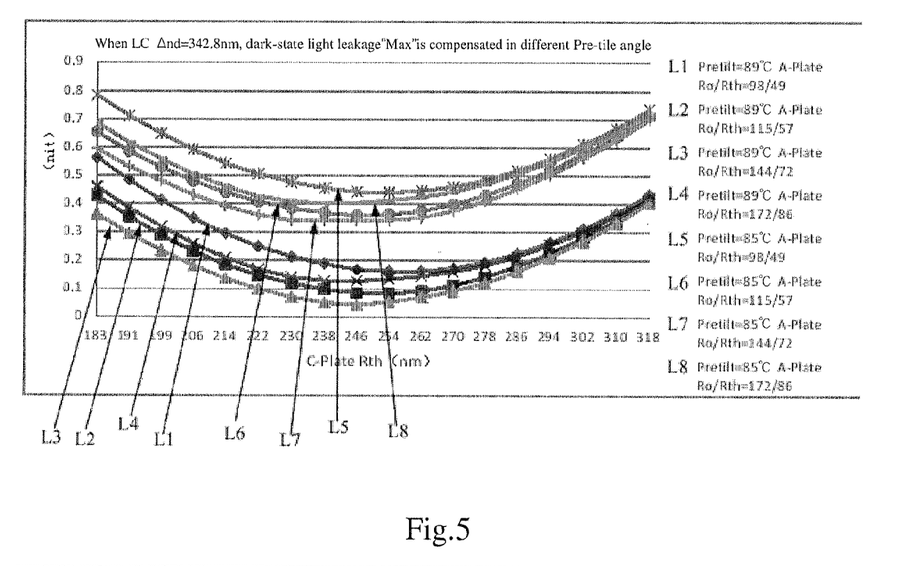
FIG. 5 is a variation curve of the light leakage varied with retardation value of the liquid crystal display during the simulation.
Figure 6:
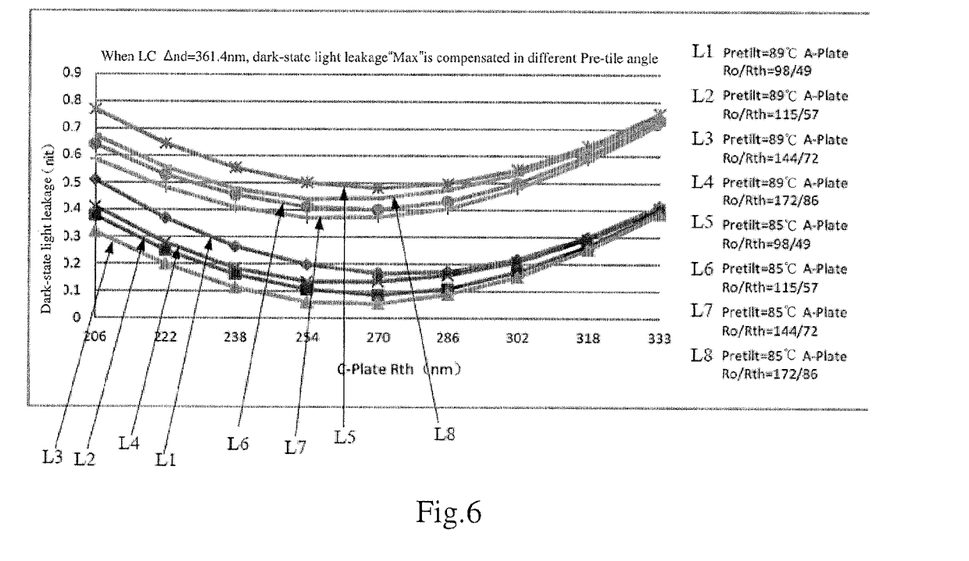
FIG. 6 is a variation curve of the light leakage varied with retardation value of the liquid crystal display during the simulation.

Referring to FIG. 5 and FIG. 6, the simulation result are shown in the variation curves of the light leakage varied with retardation value. As shown in FIG. 5, it is a variation curves of the light leakage when the optical path difference ($LC_AND$) is 342.8 nm, the pre-tilt angle is 89° and 85°, and an in-plane retardation ($R_O$) and a thickness direction retardation ($R_{th}$) of the A-Plate 36 and a thickness direction retardation ($R_{th}$) of the C-Plates 37, 38 are different values. As shown in FIG. 6, it is a variation curves of the light leakage when the optical path difference ($LC_AND$) is 361.4 nm, the pre-tilt angle is 89° and 85°, and an in-plane retardation ($R_O$) and a thickness direction retardation ($R_{th}$) of the A-Plate 36 and a thickness direction retardation ($R_{th}$) of the C-Plates 37, 38 are different values. As shown in FIG. 5 and FIG. 6, the A-Plate $R_O$ is an in-plane retardation ($R_O$) of the A-Plate 36, the A-Plate $R_{th}$ is a thickness direction retardation ($R_{th}$) of the A-Plate, and the C-Plate $R_{th}$ is a sum the thickness direction retardation ($R_{th}$) of the C-Plates 37, 38.

The effect of the compensation values of the A-Plate 36 and the C-Plates 37, 38 for the dark-state light leakage is consistent by the above-mentioned simulation in different pre-tilt angles, i.e. the range of the compensation values corresponding to the minimum value of the dark-state light leakage is consistent in different pre-tilt angles. According to the simulation result, when the optical path difference ($LC_AND$) is [342.8 nm, 361.4 nm], the pre-tilt angle is [85°, 90°] and the dark-state light is less than 0.2 nit (i.e. a simulated dark-state light leakage when the pre-tilt angle is 89°, not actual measured value), a corresponding range of the retardation value of the A-Plate 36 and the C-Plate 37 or the C-Plate 38 is described, as follows:
a valuing range of an in-plane optical path difference compensation value ($R_O$) of the A-Plate 36 at 550 nm is 98 nm≤$R_O$≤172 nm, a valuing range of an out-of-plane optical path difference compensation value ($R_{th}$) thereof is 49 nm≤$R_{th}$≤86 nm, a valuing range of a compensation value ($R_{th}$) of the C-Plate 37 is $Y_1$≤$R_{th}$≤$Y_2$, and $Y_1$ and $Y_2$ satisfies the following functions (1) and (2):

$$Y_1=-0.000415X^3+0.11423X^2-9.845X+373.67 \quad (1)$$

$$Y_2=0.000105X^3-0.038075X^2+3.7X+46.15 \quad (2)$$

wherein X is the out-of-plane optical path difference compensation value ($R_{th}$) of the A-Plate.

The range of a compensation value is shown, as follows:

| $LC_AND$ | A-Plate $R_o$ | A-Plate $R_{th}$ | C-Plate $R_{th}$ |
|---|---|---|---|
| [342.8 nm, 361.4 nm] | [98 nm, 172 nm] | [49 nm, 86 nm] | [$Y_1$, $Y_2$] |

Specifically, the in-plane optical path difference compensation value ($R_O$) of the A-Plate 36 and the out-of-plane optical path difference compensation value ($R_{th}$) of the A-Plate 36 are obtained by the following functions (3) and (4):

$$R_O=(N_x-N_y)\times d_1 \quad (3)$$

$$R_{th}=[(N_x+N_y)/2-N_z]\times d_1 \quad (4)$$

wherein $N_x$ is a X-directional refractive index of a maximum refractive index inside the A-Plate 36, $N_y$ is a Y-directional refractive index perpendicular to an in-plane direction X of the A-Plate 36, $N_z$ is a refractive index of a thickness direction of the A-Plate 36, $d_1$ is a thickness of the A-Plate, and $N_x$>$N_y$, $N_y$=$N_z$.

The range of the compensation value ($R_{th}$) of the C-Plate is adjusted and obtained by the following function (5):

$$R_{th}=[(M_x+M_y)/2-M_z]\times d_2 \quad (5)$$

wherein $M_x$ is a X-directional refractive index of a maximum refractive index inside the C-Plate, $M_y$ is a Y-directional refractive index perpendicular to an in-plane direction X of the C-Plate, $M_z$ is a refractive index of a thickness direction of the C-Plate, $d_2$ is a thickness of the C-Plate, and $M_x$=$M_y$, $M_y$>$M_z$.

For example, the embodiments A, B and C are described below to explain how to adjust the A-Plate 36 and C-Plate 37 according to the functions (3), (4) and (5), as follows:

Embodiment A: when the values of the refractive indexes ($N_x$, $N_y$, $N_z$) of the A-Plate 36 are known, a thickness ($d_1$) of the A-Plate 36 is adjusted, and the valuing range of the in-plane optical path difference compensation value ($R_O$) of the A-Plate 36 is adjusted to 98 nm≤$R_O$≤172 nm and the valuing range of the out-of-plane optical path difference compensation value ($R_{th}$) is adjusted to 49 nm≤$R_{th}$≤86 nm according to the functions (3) and (4).

When the values of the refractive indexes ($N_x$, $N_y$, $N_z$) of the C-Plate 37 are known, the thickness ($d_2$) of the C-Plate 37 is adjusted, and the valuing range of the compensation value ($R_{th}$) of the C-Plate 37 is adjusted to $Y_1$≤$R_{th}$≤$Y_2$ according to the function (5).

Embodiment B: when we the value of the thickness ($d_1$) of the A-Plate 36 is known, the refractive indexes ($N_x$, $N_y$, $N_z$) of the A-Plate 36 are adjusted, and the valuing range of the in-plane optical path difference compensation value ($R_O$) of the A-Plate 36 is adjusted to 98 nm≤$R_O$≤172 nm and the valuing range of the out-of-plane optical path difference compensation value ($R_{th}$) is adjusted to 49 nm≤$R_{th}$≤86 nm according to the functions (3) and (4).

When the value of the thickness ($d_2$) of the C-Plate 37 is known, the refractive indexes ($N_x$, $N_y$, $N_z$) of the C-Plate 37 are adjusted, and the valuing range of the compensation value ($R_{th}$) of the C-Plate 37 is adjusted to $Y_1$≤$R_{th}$≤$Y_2$ according to the function (5).

Embodiment C: firstly, the thickness ($d_1$) and the refractive indexes ($N_x$, $N_y$, $N_z$) of the A-Plate 36 are adjusted; then, the valuing range of the in-plane optical path difference compensation value ($R_O$) of the A-Plate 36 is adjusted to 98 nm≤$R_O$≤172 nm and the valuing range of the out-of-plane optical path difference compensation value ($R_{th}$) is adjusted to 49 nm≤$R_{th}$≤86 nm according to the functions (3) and (4). After this, the thickness ($d_2$) and the refractive indexes ($N_x$, $N_y$, $N_z$) of the C-Plate 37 are adjusted, and the valuing range of the compensation value ($R_{th}$) of the C-Plate 37 is adjusted to $Y_1$≤$R_{th}$≤$Y_2$ according to the function (5).

Figure 7:
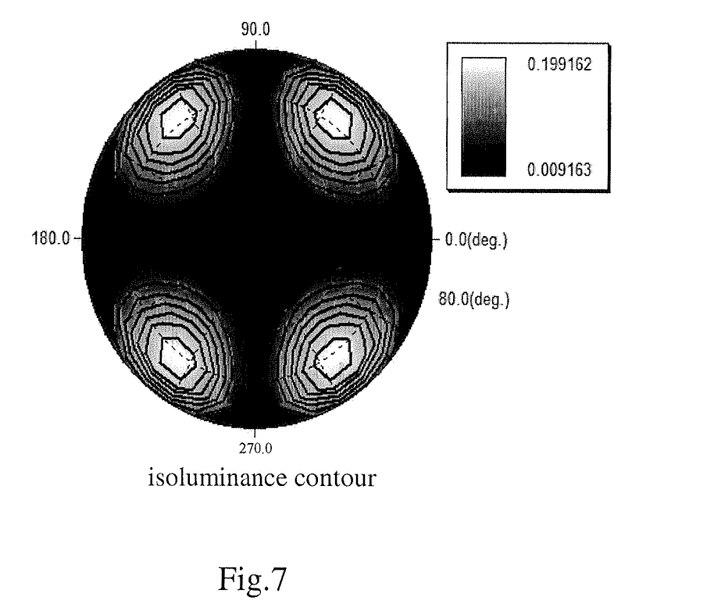
FIG. 7 is an isoluminance contour diagram of compensating the dark-state light leakage by using the compensate values of an A-Plate and a C-Plate of a preferred embodiment of the present invention.
Figure 8:
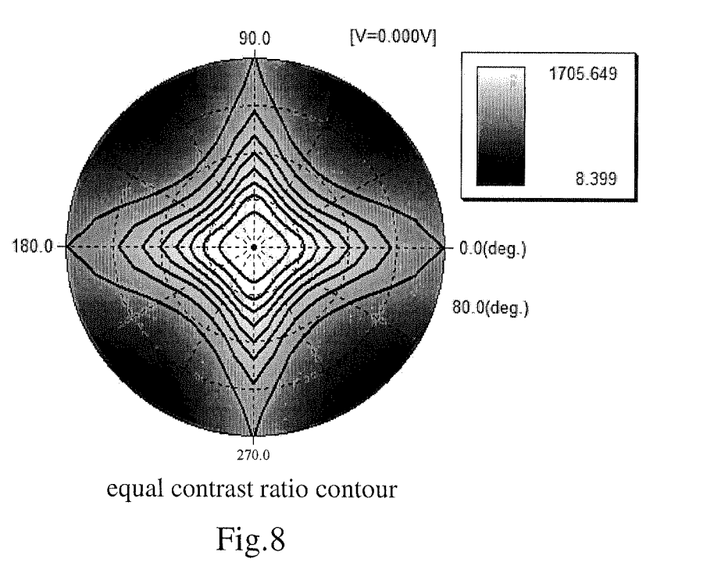
FIG. 8 is an equal contrast ratio contour diagram in full viewing angle after being compensated by using the compensate values of the A-Plate and the C-Plate of the preferred embodiment of the present invention.

The technical effect of the present invention is described by the three specific embodiments, as follows:

Embodiment 1: the setting is an optical path difference ($LC_A$ND)=352.1 nm, a pre-tilt angle=89°, a compensation value ($R_O$) of the A-Plate 36=109 nm, a $R_{th}$ thereof=55 nm, and a sum of the compensation value ($R_{th}$) of the C-Plates 37, 38=226 nm. As shown in FIG. 7, it is an isoluminance contour diagram of the dark-state light leakage corresponding to the compensation value. As shown in FIG. 8, it is an equal contrast ratio contour diagram corresponding to full viewing angle, wherein the compensation values are listed, as follows:

| optical path difference of the liquid crystal | pre-tilt angle of the liquid crystal | A-Plate $R_o$ | A-Plate $R_{th}$ | sum of the C-Plates $R_{th}$ |
|---|---|---|---|---|
| 352.1 nm | 89° | 109 nm | 55 nm | 226 nm |

Figure 9:
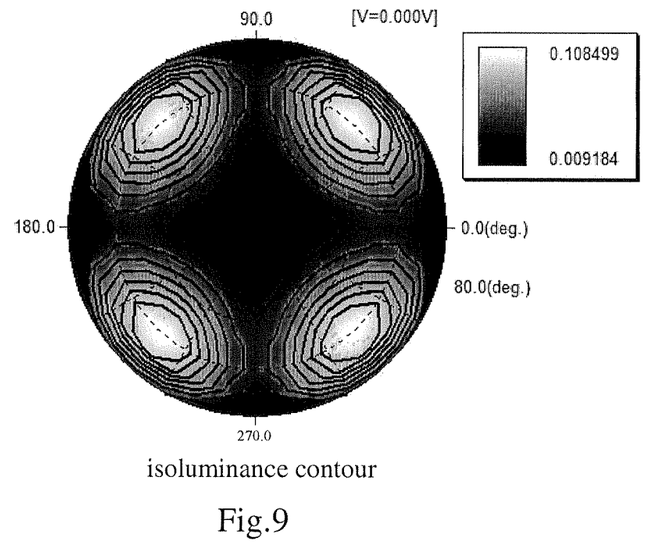
FIG. 9 is an isoluminance contour diagram of compensating the dark-state light leakage by using the compensate values of an A-Plate and a C-Plate of another preferred embodiment of the present invention.
Figure 10:
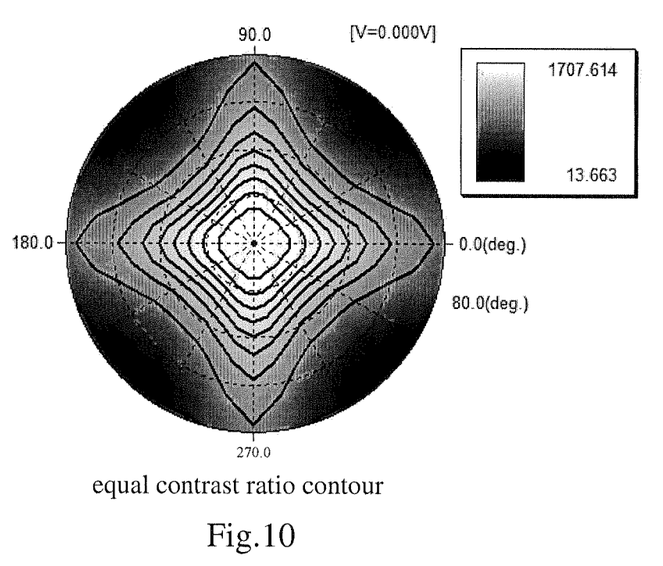
FIG. 10 is an equal contrast ratio contour diagram in full viewing angle after being compensated by using the compensate values of the A-Plate and the C-Plate of another preferred embodiment of the present invention.

Embodiment 2: the setting is an optical path difference ($LC_A$ND)=352.1 nm, a pre-tilt angle=89°, a compensation value ($R_O$) of the A-Plate 36=109 nm, a $R_{th}$ thereof=55 nm, and a sum of the compensation value ($R_{th}$) of the C-Plates 37, 38=266 nm. As shown in FIG. 9, it is an isoluminance contour diagram of the dark-state light leakage corresponding to the compensation value. As shown in FIG. 10, it is an equal contrast ratio contour diagram corresponding to full viewing angle, wherein the compensation values are listed, as follows:

| optical path difference of the liquid crystal | pre-tilt angle of the liquid crystal | A-Plate $R_o$ | A-Plate $R_{th}$ | sum of the C-Plates $R_{th}$ |
|---|---|---|---|---|
| 352.1 nm | 89° | 109 nm | 55 nm | 266 nm |

Figure 11:
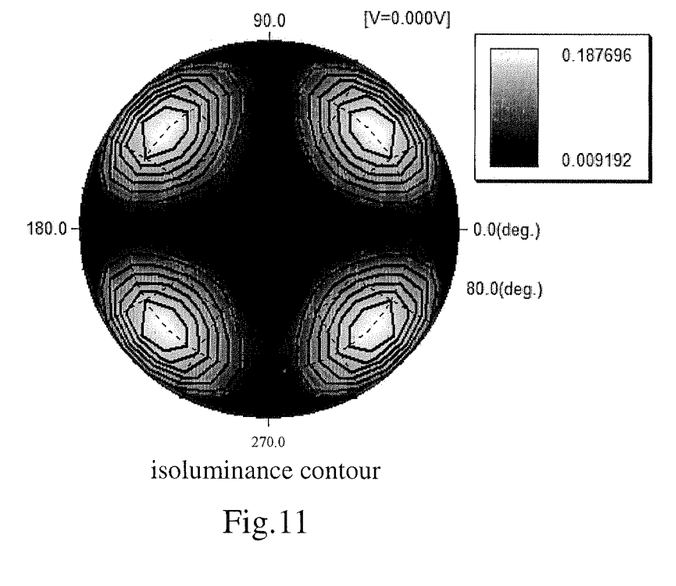
FIG. 11 is an isoluminance contour diagram of compensating the dark-state light leakage by using the compensate values of an A-Plate and a C-Plate of further another preferred embodiment of the present invention.
Figure 12:
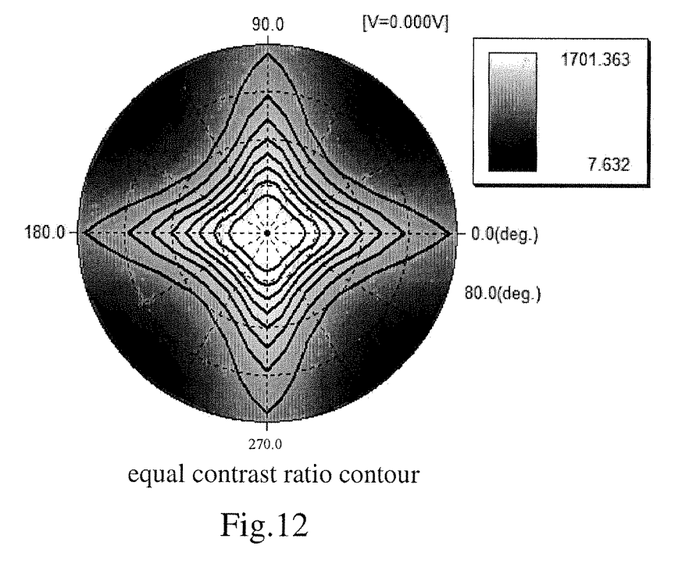
FIG. 12 is an equal contrast ratio contour diagram in full viewing angle after being compensated by using the compensate values of the A-Plate and the C-Plate of further another preferred embodiment of the present invention.

Embodiment 3: the setting is an optical path difference ($LC_A$ND)=352.1 nm, a pre-tilt angle=89°, a compensation value ($R_O$) of the A-Plate 36=109 nm, a $R_{th}$ thereof=55 nm, and a compensation value ($R_{th}$) of the C-Plates 37, 38=294 nm. As shown in FIG. 11, it is an isoluminance contour diagram of the dark-state light leakage corresponding to the compensation value. As shown in FIG. 12, it is an equal contrast ratio contour diagram corresponding to full viewing angle, wherein the compensation values are listed, as follows:

| optical path difference of the liquid crystal | pre-tilt angle of the liquid crystal | A-Plate $R_o$ | A-Plate $R_{th}$ | sum of the C-Plates $R_{th}$ |
|---|---|---|---|---|
| 352.1 nm | 89° | 109 nm | 55 nm | 294 nm |

The isoluminance contour diagrams of the compensate the dark-state light leakage in FIGS. 9 and 11 of the present invention are compared with the diagram of the traditional technology in FIG. 1, we can obtain that the A-Plate 36 and the C-Plate 37 using the compensate values of the embodiments of the present invention have the maximum of the dark-state light leakage which is reduced to 0.2 or less and is far lower than that of the traditional technology (=1.52) after being compensated.

The equal contrast ratio contour diagrams of full viewing angle using the compensate values of the present invention in FIGS. 10 and 12 are compared with the diagram of the traditional technology in FIG. 2, we can obtain that the A-Plate 36 and C-Plate 37 using the compensate values of the embodiment of the present invention have an equal contrast ratio distribution of full viewing angle after being compensated is better than the equal contrast ratio distribution of full viewing angle of the traditional technology. Therefore, the present invention improves the problem that the dark-state light leakage using the compensation value of A-Plate and C-Plate of the traditional technology is serious, so that the contrast and resolution of the large viewing angle are effectively enhanced.

The present invention also provides an optical compensation method for a liquid crystal display, which is applied to a VA liquid crystal display, wherein the liquid crystal display has a wavelength range at (380 nm, 760 nm), preferably is at 550 nm; a range of an optical path difference ($LC_A$ND) of the liquid crystal at 550 nm is [342.8 nm, 361.4 nm], wherein the liquid crystal display comprises an A-Plate 36, a C-Plate 37 and a C-Plate 38. For example, referring to FIG. 3, in a embodiment, the A-Plate 36 and the first C-Plate 37 are disposed between the second substrate 32 and the second polarizing film 35, the A-Plate 36, and the first C-Plate 37 comprise the same slow axis (0°), the slow axis is perpendicular to an absorption axis (90°) of the second polarizing film; The second C-Plate 38 is disposed between the first substrate 31 and the first polarizing film 34, and the second C-Plate 38 comprise the same slow axis (90°), and the slow axis is perpendicular to an absorption axis (0°) of the first polarizing film. Referring to FIG. 4, in a second embodiment, the A-Plate 36 and the first C-Plate 37 are disposed between the first substrate 31 and the first polarizing film 34, the A-Plate 36 and the first C-Plate 37 comprise the same slow axis (90°), and the slow axis is perpendicular to an absorption axis (0°) of the second polarizing film; The second C-Plate 38 is disposed between the second substrate 32 and the second polarizing film 35, and the second C-Plate 38 comprise a slow axis) (0°), and the slow axis is perpendicular to an absorption axis (90°) of the second polarizing film 35.

An optical compensation method for a liquid crystal display of the present invention comprising steps of:

1. adjusting a valuing range of an in-plane optical path difference compensation value ($R_O$) of a A-Plate 36 to 98 nm≤$R_O$≤172 nm;

2. adjusting a valuing range of an out-of-plane optical path difference compensation value ($R_{th}$) of the A-Plate to 49 nm≤$R_{th}$≤86 nm; and 3. adjusting a valuing range of a compensation value $R_{th}$ of the C-Plates 37, 38 to $Y_1 \leq R_{th} \leq Y_2$, wherein $Y_1$ and $Y_2$ satisfies the following functions:

$$Y_1 = -0.000415X^3 + 0.11423X^2 - 9.845X + 373.67;$$

$$Y_2 = 0.000105X^3 - 0.038075X^2 + 3.7X + 46.15;$$

wherein X is the out-of-plane optical path difference compensation value ($R_{th}$) of the A-Plate 36.

It should be noted that the above-mentioned steps 1, 2 and 3 has no particular orders.

In the embodiment, the valuing range of the in-plane optical path difference compensation value ($R_0$) of the A-Plate 36 is adjusted to 98 nm≤$R_0$≤172 nm and the valuing range of the out-of-plane optical path difference compensation value ($R_{th}$) of the A-Plate 36 is adjusted to 49 nm≤$R_{th}$≤86 nm according to the functions, as follows:

$$R_0 = (N_x - N_y) \times d_1;$$

$$R_{th} = [(N_x N_y)/2 - N_z] \times d_1;$$

wherein $N_x$ is a X-directional refractive index of a maximum refractive index inside the A-Plate 36, $N_y$ is a Y-directional refractive index perpendicular to an in-plane direction X of the A-Plate 36, $N_z$ is a refractive index of a thickness direction of the A-Plate 36, $d_1$ is a thickness of the A-Plate 36, and $N_x > N_y$, $N_y = N_z$.

In the embodiment, the valuing range of the compensation value ($R_{th}$) of the C-Plate 37 is adjusted to $Y_1 \leq R_{th} \leq Y_2$ according to the functions, as follows:

$$R_{th} = [(M_x M_y)/2 - M_z] \times d_2;$$

wherein $M_x$ is a X-directional refractive index of a maximum refractive index inside the C-Plate 37 or the C-Plate 38, $M_y$ is a Y-directional refractive index perpendicular to an in-plane direction X of the C-Plate 37 or the C-Plate 38, $M_z$ is a refractive index of a thickness direction of the C-Plate or the C-Plate 38, $d_2$ is a thickness of the C-Plate 37 or the C-Plate 38, and $M_x = M_y$, $M_y > M_z$.

The specific process of adjusting the compensation value is described for the liquid crystal display hereinbefore, and thus not mentioned again herein.

The embodiments of the present invention is mainly applied to a liquid crystal display which has a wavelength at 550 nm, a range of an optical path difference ($LC_A ND$) of the liquid crystal is [342.8 nm, 361.4 nm] and the pre-tilt angle is [85°,90°], wherein the liquid crystal display has two types of the optical compensation film, i.e the A-Plate 36 and the C-Plate 37, and the dark-state light leakage of large viewing angle thereof can be reduced by adjusting the compensation values of the two types of compensation films. Thus, the present invention can increase the contrast and definition of the large viewing angle.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A liquid crystal display, wherein the liquid crystal display has a wavelength at 550 nm and a range of an optical path difference ($LC_A ND$) of the liquid crystal is 342.8 nm≤$LC_A ND$≤361.4 nm, the liquid crystal display comprising:

a first substrate;
a second substrate;
a liquid crystal layer disposed between the first substrate and the second substrate;
a first polarizing film disposed on an outer side of the first substrate;
a second polarizing film disposed on an outer side of the second substrate;
an uniaxial positive birefringence A-compensation film (A-Plate); and
two layers of uniaxial negative birefringence C-compensation film (C-Plate), wherein the A-Plate and two layers of the C-Plate are disposed between the first substrate and the first polarizing film or disposed between the second substrate and the second polarizing film;
wherein a valuing range of an in-plane optical path difference compensation value ($R_0$) of the A-Plate is 98 nm≤$R_0$≤172 nm, a valuing range of an out-of-plane optical path difference compensation value ($R_{th}$) of the A-Plate is 49 nm≤$R_{th}$≤86 nm; a valuing range of a compensation value ($R_{th}$) of two layers of the C-Plate is $Y_1 \leq R_{th} \leq Y_2$, and $Y_1$ and $Y_2$ satisfies the following functions:

$$Y_1 = -0.000415X^3 + 0.11423X^2 - 9.845X + 373.67;$$

$$Y_2 = 0.000105X^3 - 0.038075X^2 + 3.7X + 46.15;$$

wherein X is the out-of-plane optical path difference compensation value ($R_{th}$) of the A-Plate.

2. The liquid crystal display according to claim 1, wherein the in-plane optical path difference compensation value ($R_0$) of the A-Plate and the out-of-plane optical path difference compensation value ($R_{th}$) of the A-Plate are obtained by the following functions:

$$R_0 = (N_x - N_y) \times d_1;$$

$$R_{th} = [(N_x N_y)/2 - N_z] \times d_1;$$

wherein $N_x$ is a X-directional refractive index of a maximum refractive index inside the A-Plate, $N_y$ is a Y-directional refractive index perpendicular to an in-plane direction X of the A-Plate, $N_z$ is a refractive index of a thickness direction of the A-Plate, $d_1$ is a thickness of the A-Plate, and $N_x > N_y$, $N_y = N_z$.

3. The liquid crystal display according to claim 1, wherein the compensation value ($R_{th}$) of the C-Plate is obtained by the following function:

$$R_{th} = [(M_x + M_y)/2 - M_z] \times d_2;$$

wherein $M_x$ is a X-directional refractive index of a maximum refractive index inside the C-Plate, $M_y$ is a Y-directional refractive index perpendicular to an in-plane direction X of the C-Plate, $M_z$ is a refractive index of a thickness direction of the C-Plate, $d_2$ is a thickness of the C-Plate, and $M_x = M_y$, $M_y > M_z$.

4. The liquid crystal display according to claim 1, wherein the two layers of the C-Plate comprise a first C-Plate and a second C-Plate, the A-Plate and the first C-Plate are disposed on one side of the liquid crystal layer and the second C-Plate is disposed on the other side of the liquid crystal layer.

5. The liquid crystal display according to claim 4, wherein the A-Plate and the first C-Plate comprise the same slow axis, the slow axis is perpendicular to an absorption axis of the polarizing film located at the same side of the liquid crystal layer, and the second C-Plate is perpendicular to the absorption axis of the polarizing film located at the same side of the liquid crystal layer.

6. A liquid crystal display, comprising:
a first substrate;
a second substrate;
a liquid crystal layer disposed between the first substrate and the second substrate;
a first polarizing film disposed on an outer side of the first substrate;
a second polarizing film disposed on an outer side of the second substrate;
an uniaxial positive birefringence A-compensation film (A-Plate); and
two layers of uniaxial negative birefringence C-compensation film (C-Plate), wherein the A-Plate and the two layers of the C-Plate are disposed between the first substrate and the first polarizing film or disposed between the second substrate and the second polarizing film;
wherein a valuing range of an in-plane optical path difference compensation value ($R_0$) of the A-Plate is 98 nm≤$R_0$≤172 nm, a valuing range of an out-of-plane optical path difference compensation value ($R_{th}$) of the A-Plate is 49 nm≤$R_{th}$≤86 nm, a valuing range of a compensation value ($R_{th}$) of the C-Plate is $Y_1$≤$R_{th}$≤$Y_2$, and $Y_1$ and $Y_2$ satisfies the following functions:

$$Y_1=-0.000415X^3+0.11423X^2-9.845X+373.67;$$

$$Y_2=0.000105X^3-0.038075X^2+3.7X+46.15;$$

wherein X is the out-of-plane optical path difference compensation value ($R_{th}$) of the A-Plate.

7. The liquid crystal display according to claim 6, wherein the in-plane optical path difference compensation value ($R_0$) of the A-Plate and the out-of-plane optical path difference compensation value ($R_{th}$) of the A-Plate are obtained by the following functions:

$$R_0=(N_x-N_y)\times d_1;$$

$$R_{th}=[(N_x+N_y)/2-N_z]\times d_1;$$

wherein $N_x$ is a X-directional refractive index of a maximum refractive index inside the A-Plate, $N_y$ is a Y-directional refractive index perpendicular to an in-plane direction X of the A-Plate, $N_z$ is a refractive index of a thickness direction of the A-Plate, $d_1$ is a thickness of the A-Plate, and $N_x>N_y$, $N_y=N_z$.

8. The liquid crystal display according to claim 6, wherein the function of the compensation value ($R_{th}$) of the C-Plate is obtained by the following function:

$$R_{th}=[(M_x+M_y)/2-M_z]\times d_2$$

wherein $M_x$ is a X-directional refractive index of a maximum refractive index inside the C-Plate, $M_y$ is a Y-directional refractive index perpendicular to an in-plane direction X of the C-Plate, $M_z$ is a refractive index of a thickness direction of the C-Plate, $d_2$ is a thickness of the C-Plate is $d_2$ and $M_x=M_y$, $M_y>M_z$.

9. The liquid crystal display according to claim 6, wherein the two layers of the C-Plate comprise a first C-Plate and a second C-Plate, the A-Plate and the first C-Plate are disposed on one side of the liquid crystal layer and the second C-Plate is disposed on the other side of the liquid crystal layer.

10. The liquid crystal display according to claim 9, wherein the A-Plate and the first C-Plate comprise the same slow axis, the slow axis is perpendicular to an absorption axis of the polarizing film located at the same side of the liquid crystal layer, and the second C-Plate is perpendicular to the absorption axis of the polarizing film located at the same side of the liquid crystal layer.

11. An optical compensation method for a liquid crystal display, comprising steps of:
adjusting a valuing range of an in-plane optical path difference compensation value ($R_0$) of an uniaxial positive birefringence A-compensation film (A-Plate) to 98 nm≤$R_0$≤172 nm;
adjusting a valuing range of an out-of-plane optical path difference compensation value ($R_{th}$) of the A-Plate to 49 nm≤$R_{th}$≤86 nm; and
adjusting a valuing range of a compensation value $R_{th}$ of uniaxial negative birefringence C-compensation films (C-Plates) to $Y_1$≤$R_{th}$≤$Y_2$, wherein $Y_1$ and $Y_2$ satisfies the following functions:

$$Y_1=-0.000415X^3+0.11423X^2-9.845X+373.67;$$

$$Y_2=0.000105X^3-0.038075X^2+3.7X+46.15;$$

wherein X is the out-of-plane optical path difference compensation value ($R_{th}$) of the A-Plate; and the A-Plate and the C-Plates are disposed between a first substrate and a first polarizing film of the liquid crystal display or disposed between a second substrate and a second polarizing film of the liquid crystal display.

12. The optical compensation method for the liquid crystal display according to claim 11, wherein the steps of adjusting the valuing range of the in-plane optical path difference compensation value ($R_0$) of the A-Plate to 98 nm≤$R_0$≤172 nm and adjusting the valuing range of the optical path difference compensation value ($R_{th}$) of the outer side of the A-Plate to 49 nm $R_{th}$≤86 nm are executed by the following functions:

$$R_0=(N_x-N_y)\times d_1;$$

$$R_{th}=[(N_x+N_y)/2-N_z]\times d_1;$$

wherein $N_x$ is a X-directional refractive index of a maximum in-plane refractive index of the A-Plate, $N_y$ is a Y-directional refractive index perpendicular to an in-plane direction X of the A-Plate, $N_z$ is a refractive index of a thickness direction of the A-Plate, $d_1$ is a thickness of the A-Plate, and $N_x>N_y$, $N_y=N_z$.

13. The optical compensation method for the liquid crystal display according to claim 11, wherein the step of adjusting a valuing range of the compensation value ($R_{th}$) of the C-Plates to $Y_1$≤$R_{th}$≤Y2 is executed by the following function:

$$R_{th}=[(M_x+M_y)/2-M_z]\times d_2$$

wherein $M_x$ is a X-directional refractive index of a maximum in-plane refractive index of the C-Plates, $M_y$ is a Y-directional refractive index perpendicular to an in-plane direction X of the C-Plates, $M_z$ is a refractive index of the thickness direction of the C-Plate, $d_2$ is a thickness of the C-Plate, and $M_x=M_y$, $M_y>M_z$.

14. The optical compensation method for the liquid crystal display according to claim 11, wherein two layers of the C-Plates comprise a first C-Plate and a second C-Plate, the A-Plate and the first C-Plate are disposed on one side of the liquid crystal layer and the second C-Plate is disposed on the other side of the liquid crystal layer.

15. The optical compensation method for the liquid crystal display according to claim 11, wherein the A-Plate and the first C-Plate comprise the same slow axis, the slow axis is perpendicular to an absorption axis of the polarizing film located at the same side of the liquid crystal layer, and the second C-Plate is perpendicular to the absorption axis of the polarizing film located at the same side of the liquid crystal layer.

* * * * *